(12) United States Patent
Baumann

(10) Patent No.: US 9,289,796 B2
(45) Date of Patent: Mar. 22, 2016

(54) TREATMENT ARRANGEMENT FOR FERROMAGNETIC PARTS

(71) Applicant: GESI Gewindesicherungs-GmbH, Plochingen (DE)

(72) Inventor: Waldemar Baumann, Esslingen (DE)

(73) Assignee: GESI Gewindesicherungs-GmbH, Plochingen (DE)

( * ) Notice: Subject to any disclaimer, the term of this patent is extended or adjusted under 35 U.S.C. 154(b) by 47 days.

(21) Appl. No.: 14/255,071

(22) Filed: Apr. 17, 2014

(65) Prior Publication Data
US 2015/0298159 A1 Oct. 22, 2015

(51) Int. Cl.
| B65G 47/92 | (2006.01) |
| B05C 13/02 | (2006.01) |
| B05C 11/00 | (2006.01) |
| B05C 21/00 | (2006.01) |
| B65G 29/00 | (2006.01) |
| B65G 47/06 | (2006.01) |
| B65G 47/51 | (2006.01) |
| B65G 47/84 | (2006.01) |

(52) U.S. Cl.
CPC ............... B05C 13/02 (2013.01); B05C 11/00 (2013.01); B05C 21/00 (2013.01); B65G 29/00 (2013.01); B65G 47/06 (2013.01); B65G 47/5136 (2013.01); B65G 47/848 (2013.01)

(58) Field of Classification Search
CPC .. B65G 47/06; B65G 47/5136; B65G 47/848; C21D 8/12; C21D 9/0018; C21D 9/0093; C21D 2211/005; F26B 15/06
USPC .......... 198/550.3, 478.1, 483.1, 396, 379.05, 198/690.1, 778; 193/35 S
See application file for complete search history.

(56) References Cited

U.S. PATENT DOCUMENTS

| 3,318,439 | A | * | 5/1967 | Sullivan ..................... 198/347.1 |
| 3,490,575 | A | * | 1/1970 | Herrmann ................ 198/377.01 |
| 4,501,380 | A | * | 2/1985 | Welch ............................. 193/12 |
| 5,234,304 | A | * | 8/1993 | Okumoto et al. .......... 198/475.1 |
| 5,862,905 | A | * | 1/1999 | Shimonishi ................... 198/619 |

FOREIGN PATENT DOCUMENTS

| DE | 10 2011 119 366 A1 | 5/2013 |
| EP | 2 607 273 A1 | 6/2013 |

* cited by examiner

*Primary Examiner* — James R Bidwell
(74) *Attorney, Agent, or Firm* — Collard & Roe, P.C.

(57) ABSTRACT

There is a treatment arrangement for ferromagnetic parts, particularly screws and nuts, comprising at least a treatment wheel having at least one magnet for holding the ferromagnetic parts on the circumference of the treatment wheel, a feed apparatus for feeding the ferromagnetic parts to the treatment wheel and for placing the ferromagnetic parts on a first circumference line of the treatment wheel, a treatment apparatus for treating the ferromagnetic parts, and a discharge apparatus for removing the ferromagnetic parts from the treatment wheel. The treatment wheel comprises at least one further circumference line for holding the ferromagnetic parts, and that the treatment arrangement furthermore comprises means for transferring the ferromagnetic parts from the first circumference line of the treatment wheel to a second adjacent circumference line of the treatment wheel.

11 Claims, 3 Drawing Sheets

TREATMENT ARRANGEMENT FOR FERROMAGNETIC PARTS

BACKGROUND OF THE INVENTION

1. Field of the Invention

The invention relates to a treatment arrangement for ferromagnetic parts, particularly screws and nuts, comprising at least a treatment wheel having at least one magnet for holding the ferromagnetic parts on the circumference of the treatment wheel, a feed apparatus for feeding the ferromagnetic parts to the treatment wheel and for placing the ferromagnetic parts on a first circumference line of the treatment wheel, a treatment apparatus for treating the ferromagnetic parts, and a discharge apparatus for removing the ferromagnetic parts from the treatment wheel.

2. Description of the Related Art

Treatment arrangements for ferromagnetic parts, of the type stated initially, are generally used as a drying apparatus, particularly after coating of threaded sections of screws and nuts with compositions that counteract loosening of a screw connection. Preheating is often required in order to bring the parts to be treated to a suitable temperature.

The drying apparatus is equipped with one or a plurality of magnets, which serve to hold the coated parts, whereby the treated sections of the parts are positioned in such a manner that they stand alone and do not come into contact with other adjacent parts or machine elements. The drying apparatus is generally disposed in a heated space, in order to guarantee optimal drying.

However, it is problematic, in the case of such apparatuses, that they have very large dimensions. This is because the size of the treatment wheels is influenced, on the one hand, by the desired length of the drying segment, and, on the other hand, by the desired throughput—very great throughput is aimed at—of the system. When the planned dwell time remains the same, but the throughput is increased, the length of the drying segment—and consequently the diameter of the drying wheel—must be increased. Very high operating costs result from this, because means dimensioned in accordance with the size of the drying apparatus must be provided for the drive and for drying. In addition, monitoring of such a drying apparatus by a single person is not possible, because of its size.

SUMMARY OF THE INVENTION

Proceeding from this, the invention is based on the task of indicating a novel treatment arrangement for ferromagnetic parts, having a low space requirement, low production and operating costs, reduced monitoring effort, and increased production output.

This task is accomplished in that the treatment wheel comprises at least one further circumference line for holding the ferromagnetic parts, and that the treatment arrangement furthermore comprises means for transferring the ferromagnetic parts from the first circumference line of the treatment wheel to a second adjacent circumference line of the treatment wheel.

In this way, the result is achieved that while the drying segment of the ferromagnetic parts remains the same, the circumference of the treatment wheel can be reduced by half, because the drying segment amounts to twice the circumference of the treatment wheel. Also, energy savings are achieved in this way, for example because the volume of a space in which the treatment wheel is disposed and that must be heated is clearly smaller than in the case of a treatment wheel according to the state of the art. The required drive power is also reduced as compared with the state of the art. It is furthermore evident that a smaller arrangement can be monitored by a single person.

A further improved embodiment of the invention provides that the treatment arrangement furthermore has means for transferring the magnetic parts from the second circumference line of the treatment wheel to a third adjacent circumference line of the treatment wheel.

An embodiment in which means for transferring the ferromagnetic parts from the third circumference line of the treatment wheel to a fourth adjacent circumference line of the treatment wheel are provided is furthermore preferred.

In this way, a further reduction in size of the system is furthermore made possible. In this way, the production output can be increased while simultaneously lowering the operating costs, because multiple systems can be disposed on the same surface area.

In the sense of the invention, a surface section that runs along the circumference of the treatment wheel, essentially in a straight line, is understood to be a circumference line of the treatment wheel.

Preferably, the means for transferring the ferromagnetic parts are configured as a deflection plate. By means of this simple structure of the means for transferring the ferromagnetic parts, it is possible to bring about displacement of the ferromagnetic parts that can be produced in cost-advantageous manner but is effective and essentially problem-free, from one circumference line of the treatment wheel to an adjacent circumference line of the treatment wheel.

To remove the parts from the treatment wheel, the discharge apparatus is preferably also configured as a deflection plate.

An even more preferred embodiment provides that the treatment apparatus is configured directly in the vicinity of the treatment wheel, for treating rotating ferromagnetic parts.

In this way, the result is achieved that an even more compact treatment arrangement can be made available, because placing a treatment apparatus ahead of it is eliminated. Also, it can be provided that the treatment apparatus can be configured in modular manner. For example, the actual treatment step can be preceded by pretreatment, for example preheating, so that the rotating ferromagnetic parts can be subjected to a complete treatment method directly on the treatment wheel.

The treatment apparatus is furthermore preferably configured to carry out at least one treatment selected from a list comprising preheating, coating, surface finishing, and drying.

The invention furthermore provides that the treatment wheel is equipped with a plurality of magnets. In this way, the production effort of the treatment wheel is reduced.

Furthermore preferably, the magnets of the plurality of magnets are configured for holding a single ferromagnetic part. This preferably takes place in that the magnets are dimensioned accordingly and disposed spaced apart from one another, so that their surface surfaces and magnetic forces are sufficient only for holding a single ferromagnetic part. The ferromagnetic parts can thereby also be disposed spaced apart along the circumference of the treatment wheel. This is particularly advantageous if the parts must necessarily demonstrate a minimal distance from one another for the treatment to be carried out, for example if complete coating of the threaded section of a screw can be carried out. Also, in this way ferromagnetic parts disposed adjacent to one another are prevented from coming into contact with one another during drying, and thereby the treatment carried out would be negatively influenced.

The treatment arrangement preferably comprises a plurality of treatment wheels. Particularly if the treatment wheels are disposed one on top of the other, the production output can be increased, at the same space requirement of a treatment arrangement according to the invention, by means of the use of multiple treatment wheels, whereby the production and operating costs are lowered, for example in that a single drive is made available for the plurality of treatment wheels, or a single heating source is made available for drying.

A further preferred embodiment provides that at least one circumference line is disposed on a different treatment wheel from the adjacent circumference line. This is particularly advantageous if a further method step follows the treatment arrangement according to the invention. The second treatment wheel can thereby be provided as a buffer, so that if the subsequent method step cannot be performed, for example due to a problem, the treatment arrangement according to the invention does not necessarily have to be stopped. The ferromagnetic parts that have already been treated are guided to the adjacent treatment wheel, using known means, for this purpose, and pass through a buffer zone until the subsequent method step can be performed again.

BRIEF DESCRIPTION OF THE DRAWINGS

Exemplary embodiments of the invention will be explained in greater detail below, using the figures. These show.

DETAILED DESCRIPTION OF THE PREFERRED EMBODIMENTS

Figure 1:
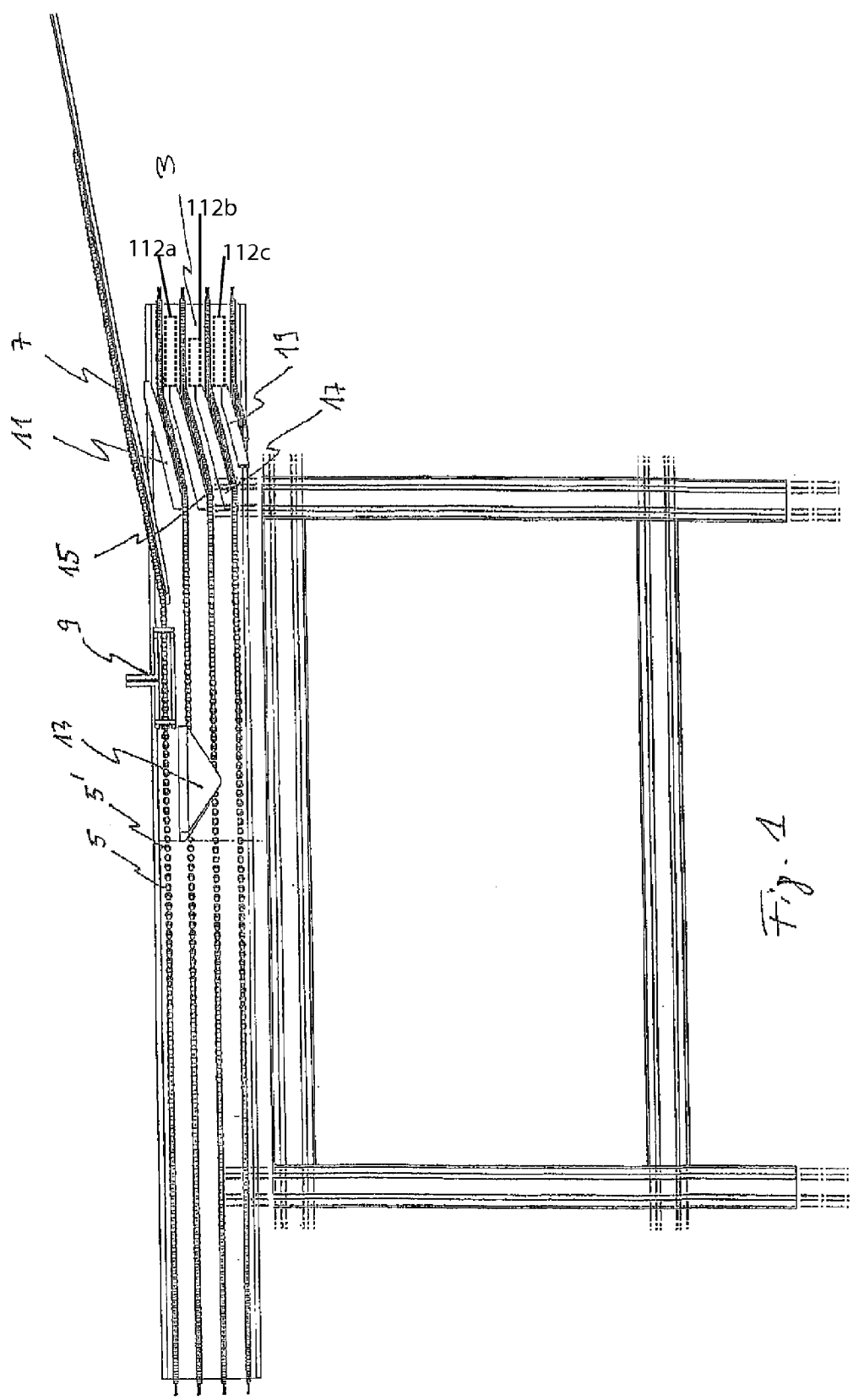
FIG. 1: a side view of the first preferred exemplary embodiment of the invention.

FIG. 1 shows a treatment arrangement for ferromagnetic parts, referred to in its entirety with 1. The treatment arrangement 1 comprises a treatment wheel 3 that is provided with at least one magnet such as magnets 112a, 112b, or 112c, which is disposed on a circumference surface of the treatment wheel 3. The magnet serves to hold parts 5, 5' to be treated, of which also only a few are provided with reference symbols, for the sake of clarity. The treatment wheel is furthermore driven and put into rotation, using known means.

The parts 5, 5' to be coated are screws here. The screws 5, 5' to be coated are passed to the treatment wheel 3 by a metal sheet 7 configured as a slide, by the effect of gravity. The screws 5, 5' are furthermore disposed in such a manner that their screw heads face the circumference surface of the treatment wheel. Because of the magnetic force of the magnet disposed on the circumference surface of the treatment wheel 3, the screw heads of the screws 5, 5' adhere to the magnet, along a first circumference line of the treatment wheel 3.

The screws 5, 5' then first pass through a heating device schematically represented with 9, where they are brought to treatment temperature. The structure of the heating device 9 is known to a person skilled in the art. It can be configured, for example, as an inductive heater, as a heat radiator, as a burner, etc.

After rotation of the treatment wheel 3 by about 340°, the screws 5, 5' then get to a deflection plate 11, which brings about displacement of the screws 5, 5' from the first circumference line to an adjacent and lower second circumference line.

Figure 2:
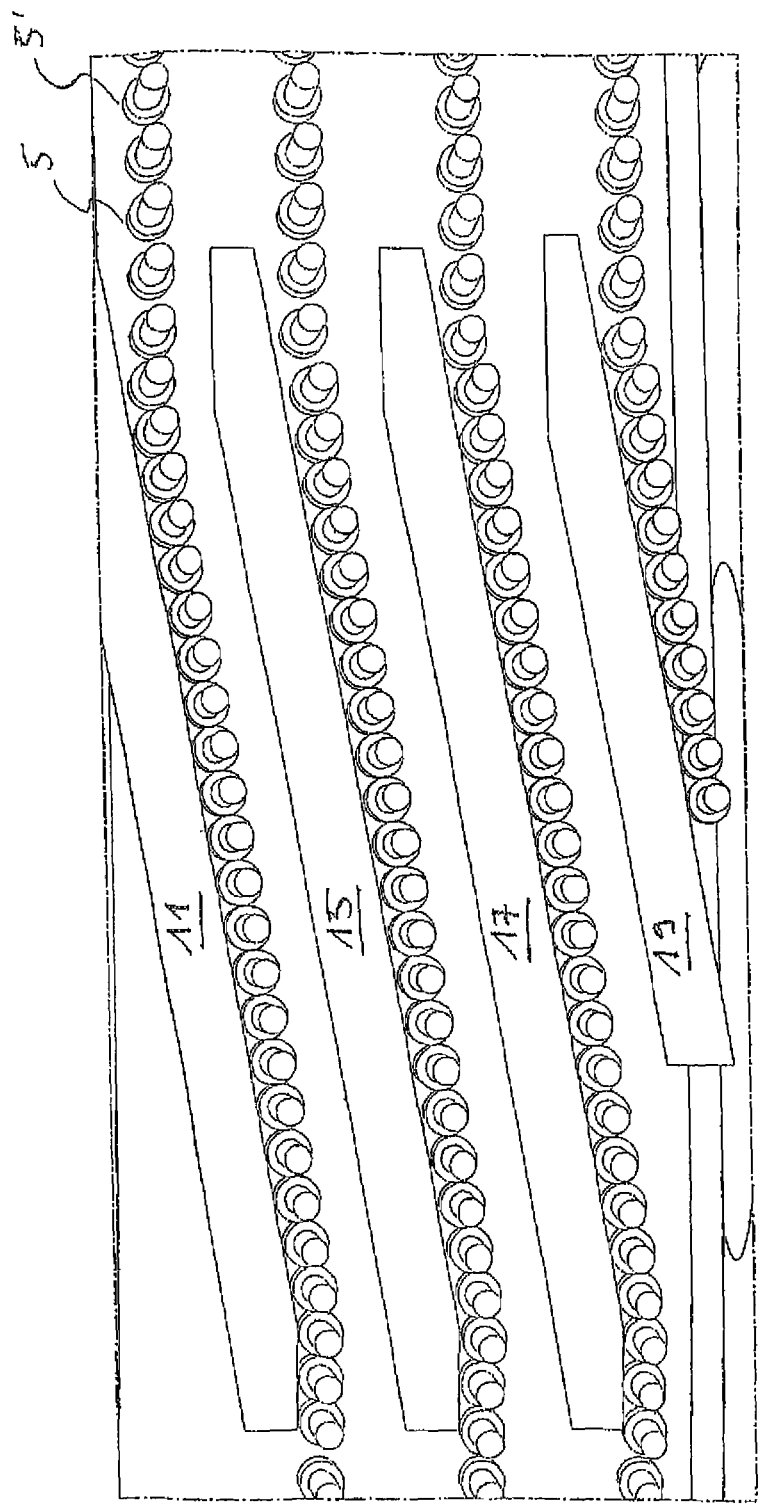
FIG. 2: a detail view of the means for transferring the ferromagnetic parts of FIG. 1.

In FIG. 2, a detail view of the deflection plate 11 is shown. As the treatment wheel 3 turns, the screw heads of the screws 5, 5' experience contact against a surface of the deflection plate 11, which is directed diagonally downward viewed in the tangential direction of the treatment wheel 3. As a result, the screw heads of the screws 5, 5' are displaced axially downward along the circumference surface of the treatment wheel 3.

The screws 5, 5', which now move along a second circumference line of the treatment wheel 3, then reach a treatment apparatus 13, where the actual treatment of the screws 5, 5' takes place. The treatment apparatus 13 shown in FIG. 1 is a coating apparatus that is known to a person skilled in the art and does not require any further explanation.

It is furthermore evident from FIGS. 1 and 2 that after renewed rotation of the treatment wheel 3 by about 340°, the screws 5, 5' that are moving along a second circumference line of the treatment wheel 3 reach a further deflection plate 15, where they are displaced, analogous to the first deflection plate 11, from the second circumference line to a third adjacent and lower circumference line.

The situation is similar for the deflection plate 17, which serves to displace the screws 5, 5' from the third circumference line to a fourth adjacent and lower circumference line.

Furthermore, a further deflection plate 19 is provided, which serves to remove the screws 5, 5' from the treatment wheel 3, in that they are deflected downward from the treatment wheel 3 until the magnetic force no longer suffices for holding the screws 5, 5' on the circumference of the treatment wheel 3, and consequently they are stripped off from the treatment wheel 3. The screws 5, 5' can subsequently be passed to a further method step, using known means.

Figure 3:
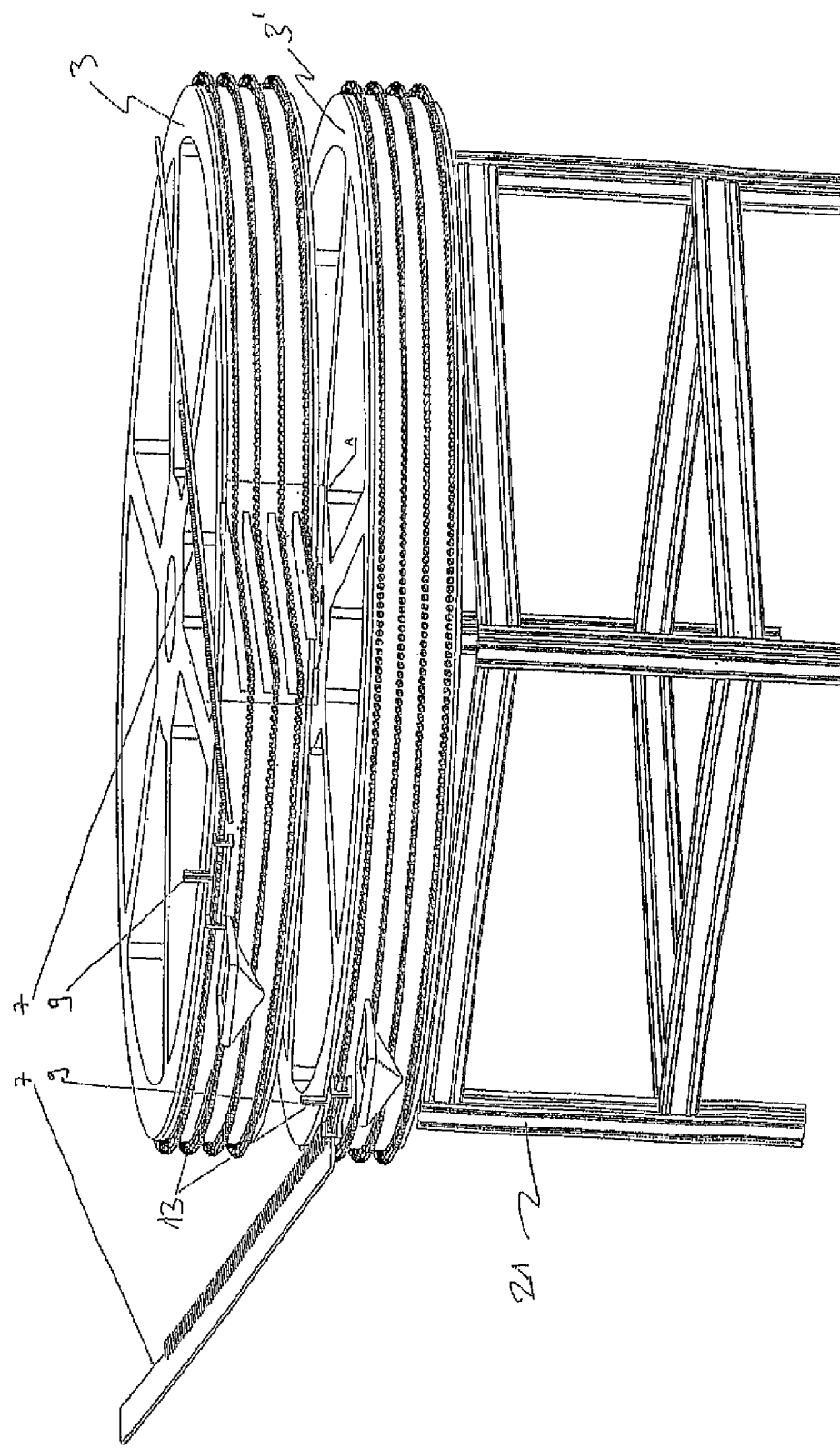
FIG. 3: a second preferred embodiment of the invention.

FIG. 3 shows a further preferred embodiment of the invention, wherein two treatment wheels 3, 3' are disposed on a frame 21. In this case, it is provided that the treatment wheels 3, 3' rotate in opposite directions and are equipped, in each instance, with a preheating device and a treatment device.

However, it can certainly be provided that depending on the purpose of use, the additional treatment wheel 3' serves only as a buffer wheel or as an additional treatment wheel for the actual treatment wheel 3, in order to increase the drying time and the drying segment.

The invention claimed is:

1. Treatment arrangement for ferromagnetic parts, particularly screws and nuts, comprising at least:
   a treatment wheel having at least one magnet for holding the ferromagnetic parts on the circumference of the treatment wheel,
   a feed apparatus for feeding the ferromagnetic parts to the treatment wheel and for placing the ferromagnetic parts on a first circumference line of the treatment wheel,
   a treatment apparatus for treating the ferromagnetic parts, and
   a discharge apparatus for removing the ferromagnetic parts from the treatment wheel, wherein the treatment wheel comprises at least one further circumference line for holding the ferromagnetic parts, and wherein the treatment arrangement furthermore comprises means for transferring the ferromagnetic parts from the first circumference line of the treatment wheel to a second adjacent circumference line of the treatment wheel.

2. Treatment arrangement according to claim 1, wherein the treatment arrangement furthermore comprises means for transferring the ferromagnetic parts from the second circumference line of the treatment wheel to a third adjacent circumference line of the treatment wheel.

3. Treatment arrangement according to claim 2, wherein the treatment arrangement furthermore comprises means for transferring the ferromagnetic parts from the third circumference line of the treatment wheel to a fourth adjacent circumference line of the treatment wheel.

4. Treatment arrangement according to claim 1, wherein the means for transferring the ferromagnetic parts is configured as deflection plates.

5. Treatment apparatus according to claim 1, wherein the treatment apparatus is configured directly in the vicinity of the treatment wheel for treating rotating ferromagnetic parts.

6. Treatment arrangement according to claim 1, wherein the treatment apparatus is configured for carrying out at least one treatment selected from a list comprising preheating, coating, surface finishing, and drying.

7. Treatment apparatus according to claim 1, wherein the treatment wheel is equipped with a plurality of magnets.

8. Treatment apparatus according to claim 7, wherein each magnet of the plurality of magnets is configured to hold a single ferromagnetic part.

9. Treatment apparatus according to claim 1, wherein it comprises a plurality of treatment wheels.

10. Treatment arrangement according to claim 9, wherein at least one circumference line is disposed on a different treatment wheel from the adjacent circumference line.

11. Treatment arrangement according to claim 1, wherein the discharge apparatus is configured as deflection plates.

* * * * *